United States Patent
Yokota

[11] 3,854,797
[45] Dec. 17, 1974

[54] METHOD FOR FOCUSING TELEPHOTO TYPE OPTICAL SYSTEM

[75] Inventor: Hideo Yokota, Tokyo, Japan

[73] Assignee: Canon Kabushiki Kaisha, Tokyo, Japan

[22] Filed: Apr. 26, 1973

[21] Appl. No.: 354,704

[30] Foreign Application Priority Data
June 7, 1972 Japan.................... 47-56076

[52] U.S. Cl................ 350/214, 350/216, 350/255
[51] Int. Cl......... G02b 9/00, G02b 9/64, G02b 9/60
[58] Field of Search ........... 350/184, 255, 214, 216

[56] References Cited
UNITED STATES PATENTS

| 3,501,224 | 3/1970 | Takahashi | 350/184 |
| 3,625,595 | 12/1971 | Fleischman | 350/255 X |
| 3,640,605 | 2/1972 | Sissel | 350/184 |

*Primary Examiner*—Paul A. Sacher
*Attorney, Agent, or Firm*—Toren, McGeady and Stanger

[57] ABSTRACT

A method for focusing a telephoto type objective system comprising a front lens group of positive power and a rear lens group composed of a plurality of lens members, said rear lens group comprising at least two movable lens members, and said two movable lens members being moved in relationship relative to each other along an optical axis when focusing said telephoto type objective system.

15 Claims, 12 Drawing Figures

METHOD FOR FOCUSING TELEPHOTO TYPE OPTICAL SYSTEM

In focusing telephoto type optical systems, it is usual to move the entire objective system relatively to the image plane along an optical axis. Alternatively, however, the focusing purpose can be likewise achieved by moving part of the lens groups constituting the objective system, for example, a front lens group, or a rear lens group alone. In the case of telephoto objective systems of the type in which the entire objective assembly are movable for focusing, the axial distance through which the entire objective assembly is movable is long, and, in addition, the size and weight of the entire objective assembly are comparatively large. Consequently, not only the mechanical structures of the focusing mechanism including helicoid and the like are of large size, but also a large driving force is required while nevertheless being incapable of smooth focusing operation. Particularly, the focusing device which is driven by electric power as seen in auto-focusing cameras and television-transmitting cameras should be provided with an electric motor of large driving torque, which causes an objectionable increase in size. In contrast to the disadvantages mentioned above, the type of telephoto objectives of which the rear lens groups are movable for focusing have several advantages. For example, the necessary amount of axial movement of the movable lens groups is small, and their lightweight and compact designs make the mechanical structures of focusing devices thereof compact as well and readily adaptable for smooth focusing operation. Further, the axial distance from the first front surface of the objective system to the image plane may be kept constant during the focusing, and, therefore, a camera and an objective assembly of the type described just above attached therewith may be fixed as a unit to prevent the camera-trembling which is apt to occur when using the camera and a telephoto objective of the former type attached therewith. However, even telephoto objectives of the latter type have a defect that a large variation in the image aberration is effected by the axial movement of the rear lens group with the result that the imaging performance is largely deteriorated thereby.

It will be understood from the following description that this defect is associated with the lens configuration. In order to shorten the total axial length, almost telephoto objectives are so constructed as comprising front lens groups of positive power and rear lens groups of negative power. Of course, the telephoto objectives which are so designed as to be focused by moving only the rear lens groups are controlled in such a manner that the shorter the focusing distance, the nearer to the image plane the rear lens groups are positioned, thereby the incidence heights at which the axial rays enter divergent surfaces interposed in the rear lens groups in order to compensate residual spherical aberration are lowered so that the image spherical aberration is made extremely under-corrected.

For overcoming the defect as described above attendant on telephoto objectives of the type of which the rear lens groups are movable for focusing, this invention provides a novel lens construction such that, in conjunction with the front lens group having a positive power, comprised in the rear lens group is a plurality of lens members of which one is a positive or negative lens member (lens member A) including strong divergent surfaces which is arranged nearest to the object in the rear lens group, and another (lens member B) which is optically aligned with lens member A on the common optical axis and arranged nearest to the image plane has a negative power, the values for the focal lengths of said lens members A and B designated by $f_A$ and $f_B$ having an inequational relationship as stated $|f_A| > |f_B|$, and said lens members A and B being moved axially in a variable relationship to each other for focusing such that as the focusing distance is shortened, lens member B is moved rearwardly to a position nearer the image plane and simultaneously lens member A is moved forwardly.

According to such a focusing method, in the lens system when focused upon an object at a short distance, a lens member A is so positioned as to permit axial rays to intersect the strong divergent surfaces of the lens member A at sufficient high incidence heights to strengthen the function of compensating residual spherical aberration which will be otherwise made under-corrected by the rearward focusing movement of lens member B. Thus the variation deterioration of residual spherical aberration which has so far proposed the most serious problem in the near distance focusing by means of the rearward movement of the rear lens group can be overcome.

In this focusing method, the focal length of lens member A may be either $f_A < 0$, or $f_A > 0$. In the case of $f_A > 0$, lens member A contributes negative power to the system so that the axial movement of lens member A has an inverse effect on the near distance focusing. Therefore, when $|f_A| > |f_B|$ is violated, the amount of rearward movement of lens member B must be so greatly increased that the amount of forward movement of lens member A necessary for sufficient compensation of residual spherical aberration is unobtainable. In case of $f_A > 0$, when $|f_A| > |f_B|$ is violated, the function of divergent surfaces in lens member A is weakened, so that sufficient compensation for residual spherical aberration cannot be effected by the forward movement of lens member A.

Further, the rear lens groups of usual telephoto objectives include strong divergent front surfaces so interposed therein as to compensate strongly only for the incomplete spherical aberration correction of the front lens group but not to affect strongly off-axis rays, so that off-axis aberration variation such as astigmatism and distortion is small throughout the entire range of focusing movement of the rear lens group. Taking these advantages, this invention likewise has disposed strong divergent front surfaces in both of the lens members A and B, so that the off-axis aberration variation effected by the axial movement of these lens members can be made extremely small throughout.

The present invention will be described by referring to the attached drawings.

FIG. 5–1 are aberration curves of Example 1 when focused upon an object at infinite distance.

FIG. 5–2 are aberration curves of Example 1 when focused upon an object at a distance of −2000.

FIG. 5–3 are reference aberration curves of Example 1 when focused upon an object at a distance of −2000 on assumption that lens member A and lens member B are movable rearwardly as a unit for the near distance focusing.

FIG. 6–1 are aberration curves of Example 2 when focused upon an object at infinite distance.

FIG. 6–2 are aberration curves of Example 2 when focused at an object distance of −2000.

FIG. 7–1 are aberration curves of Example 2 when focused at infinite object distance.

FIG. 7–2 are aberration curves of Example 3 when focused at an object distance of −2000.

Figure 1:
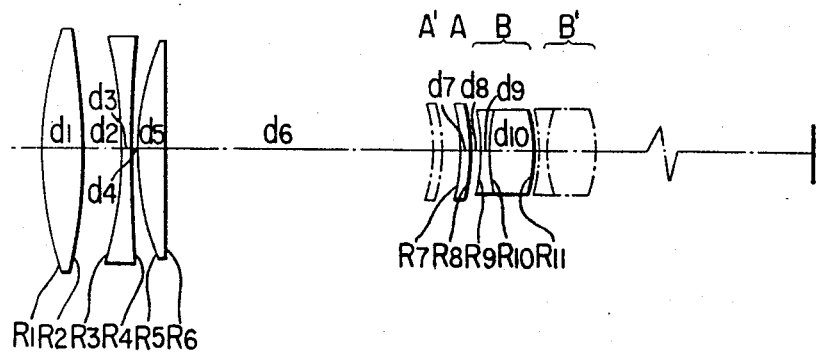
FIG. 1 is a diagrammatic view of one embodiment of the telephoto type objective system constructed as having the numerical data given in Example 1 according to this invention.
Figure 2:
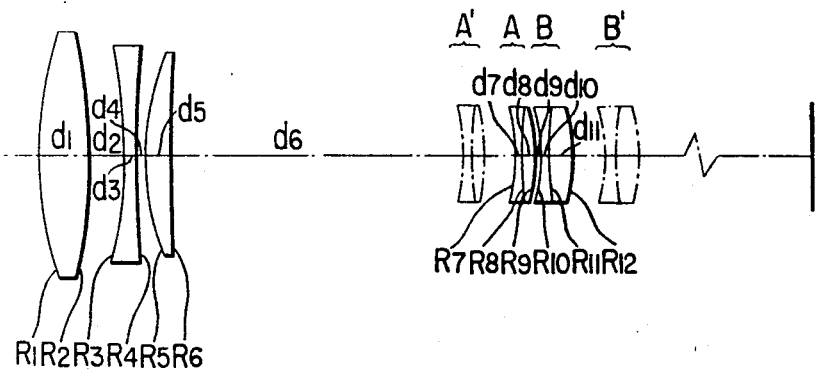
FIG. 2 is a diagrammatic view of another embodiment in accordance with the numerical data given in Example 2.
Figure 3:
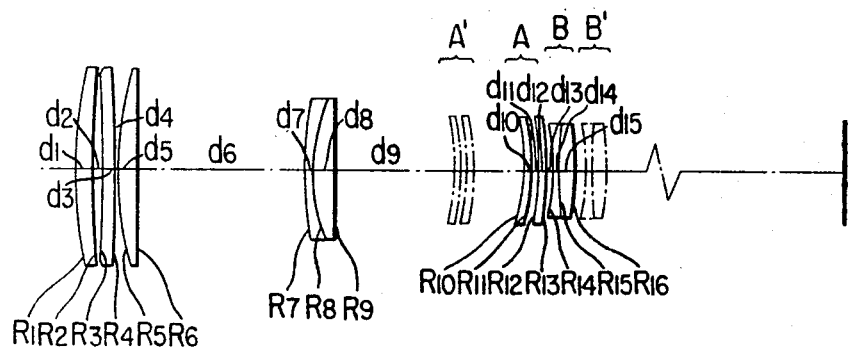
FIG. 3 is a diagrammatic view of further another embodiment in accordance with the numerical data given in Example 3.
Figure 4:
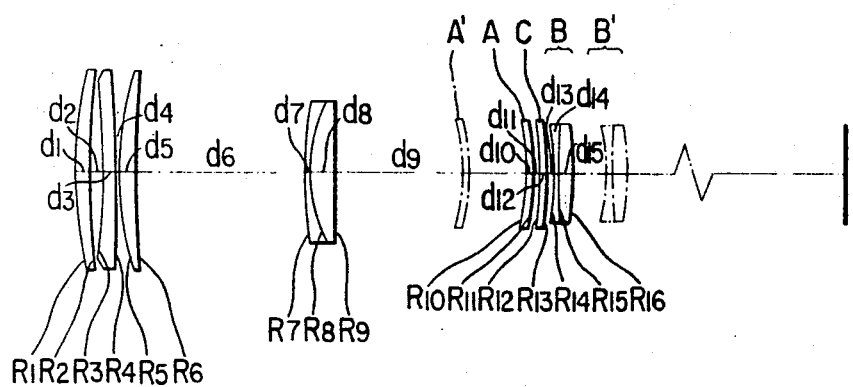
FIG. 4 is a diagrammatic view of still another embodiment in accordance with the numerical data given in Example 4.

Constructional parameters of telephoto objectives embodying the focusing method of this invention are given below. Numerical data tabulated in Example 1 and Example 2 are related to objective optical systems each in two operational positions as are shown in FIG. 1 and FIG. 2 respectively, in which each of the rear lens groups consists of two lens members A and B, and the lens member A's are divergent. Numerical data tabulated in Example 3 are related to an objective optical system in two operational positions as is shown in FIG. 3, in which the lens member A is convergent. Numerical data tabulated in Example 4 are related to an objective optical system in two operational positions as is shown in FIG. 4, in which the rear lens group consists of three lens members A, B and C of which the lens member C intervening between the other two remains axially stationary during the near distance focusing, and the lens member A is divergent. Referring to the two operational positions designated by A, B and A', B' respectively, lens member A is displaced, as for example, from position A to position A', while lens member B from position B to position B' when focusing at a short distance.

$R$: Radii of curvature of the successive refracting surfaces $d$: Distances of the successive refracting surfaces $N$: Refractive indices (for $d$ line) of the successive lens element glasses $V$: Abbe's numbers of the successive lens element glasses Example 1:

$f = 100$     $F = 5.6$     $2\omega = 4.94°$ $R_1 = 24.637$
     $d_1 = 3.0472$   $N_1 = 1.43387$    $V_1 = 95.1$
$R_2 = -43.3102$
     $d_2 = 2.5951$
$R_3 = -36.7309$
     $d_3 = 0.7995$   $N_2 = 1.79952$    $V_2 = 42.3$
$R_4 = 186.3422$
     $d_4 = 0.3993$
$R_5 = 20.4148$
     $d_5 = 1.9562$   $N_3 = 1.48749$    $V_3 = 70.1$
$R_6 = 232.0072$
     $d_6 = $ Variable
$R_7 = -14.0$
     $d_7 = 0.7016$   $N_4 = 1.51633$    $V_4 = 64.1$
$R_8 = -20.0$
     $d_8 = $ Variable
$R_9 = -11.0657$
     $d_9 = 0.5834$   $N_5 = 1.71300$    $V_5 = 54.0$
$R_{10} = 16.5321$
     $d_{10} = 2.6961$   $N_6 = 1.5927$    $V_6 = 35.6$
$R_{11} = -17.5100$ Variable axial distance:

| Object distance (from the image plane) | ∞ | −2000 |
|---|---|---|
| $d_6$ | 24.1093 | 21.4 |
| $d_8$ | 1.007 | 7.16 |
| Equivalent focal length $f$ of the entire optical system | 100 | 89.6 |

Axial distance from the first front surface to the image plane = 63.9

$f_A = -94.13$ $f_B = -30.16$

| | | Aberration coefficient (for infinite focusing distances) | | | |
|---|---|---|---|---|---|
| No. | I | II | III | P | V |
| 1 | 14.1117 | −8.2930 | 4.8736 | 1.2282 | −3.5859 |
| 2 | 44.0378 | −45.0036 | 45.9906 | 0.6986 | −47.7132 |
| 3 | −58.8160 | 58.7756 | −58.7352 | −1.2096 | 59.9037 |
| 4 | 0.0008 | 0.0113 | 0.1630 | −0.2384 | −1.0910 |
| 5 | 10.1389 | −4.9164 | 2.3840 | 1.6053 | −1.9344 |
| 6 | 3.9944 | −5.3821 | 7.2519 | −0.1413 | −9.5809 |
| 7 | −10.0349 | 5.6369 | −3.1664 | −2.4322 | 3.1449 |
| 8 | 4.8166 | −3.6220 | 2.7237 | 1.7026 | −3.3284 |
| 9 | −9.6059 | 4.3472 | −1.9674 | −3.7614 | 2.5926 |
| 10 | −0.0888 | −0.1821 | −0.3734 | −0.2667 | −1.3126 |
| 11 | 1.5298 | −1.2779 | 1.0674 | 2.1253 | −2.6669 |
| Σ | 0.0844 | 0.0939 | 0.2118 | −0.6897 | −5.5722 |

Example 2:

$f = 100$     $F = 6$     $2\omega = 3.44°$ $R_1 = 26.6156$
     $d_1 = 3.6$    $N_1 = 1.43387$    $V_1 = 95.1$
$R_2 = -49.3125$
     $d_2 = 2.623$
$R_3 = -41.5835$
     $d_3 = 0.8$    $N_2 = 1.79952$    $V_2 = 42.3$
$R_4 = 150.7491$
     $d_4 = 0.3$
$R_5 = 20.2459$
     $d_5 = 1.844$    $N_3 = 1.48749$    $V_3 = 70.1$
$R_6 = 157.2969$
     $d_6 = $ Variable -Continued $R_7 = -14$
$\quad d_7 = 0.4 \quad N_4 = 1.51633 \quad V_4 = 64.1$
$R_8 = -78.9916$
$\quad d_8 = 0.8 \quad N_5 = 1.51118$
$V_5$
x
51.0
$R_9 = -18$
$\quad d_9 =$ Variable
$R_{10} = -10.6761$
$\quad d_{10} = 0.6 \quad N_6 = 1.713 \quad V_6 = 54.0$
$R_{11} = 216.1953$
$\quad d_{11} = 1.6 \quad N_7 = 1.5927 \quad V_7 = 35.6$
$R_{12} = -15.7714$ Variable axial distance:

| Object distance (from the image plane) | ∞ | −2000 |
|---|---|---|
| $d_0$ | 25.29 | 19.4 |
| $d_9$ | 0.6 | 8.962 |
| Equivalent focal length $f$ of the entire optical system | 100 | 90.18 |

Axial distance from the first front surface to the image plane = 68.08

$f_A = -131.82$ $f_B = -37.95$

Aberration coeficient
(for infinite focusing distance)

| No. | I | II | III | P | V |
|---|---|---|---|---|---|
| 1 | 11.1925 | −6.4350 | 3.6997 | 1.1369 | −2.7807 |
| 2 | 31.4816 | −33.0833 | 34.7664 | 0.6136 | −37.1800 |
| 3 | −42.8481 | 43.9694 | −45.1201 | −1.0684 | 47.3973 |
| 4 | 0.0042 | 0.0119 | 0.0341 | −0.2947 | −0.7449 |
| 5 | 12.2557 | −6.1501 | 3.0862 | 1.6187 | −2.3610 |
| 6 | 2.3745 | −3.5147 | 5.2023 | −0.2083 | −7.3919 |
| 7 | −10.4838 | 5.7211 | −3.1221 | −2.4322 | 3.0310 |
| 8 | 0.0031 | −0.0055 | 0.0100 | 0.0028 | −0.0232 |
| 9 | 5.5948 | −3.6609 | 2.3954 | 1.8793 | −2.7971 |
| 10 | −12.0553 | 4.8846 | −1.9792 | −3.8987 | 2.3816 |
| 11 | −0.0004 | −0.0040 | −0.0424 | −0.0204 | −0.6659 |
| 12 | 2.5650 | −1.7715 | 1.2235 | 2.3595 | −2.4747 |
| Σ | 0.0838 | −0.0378 | 0.1539 | −0.3120 | −3.6092 |

Example 3:
$f = 100 \quad F = 5.6 \quad 2\omega = 6.18°$
$R_1 = 40.065$
$\quad d_1 = 1.5 \quad N_1 = 1.48749 \quad V_1 = 70.1$
$R_2 = 104.86$
$\quad d_2 = 0.9137$
$R_3 = -73.5275$ -Continued $\quad d_3 = 1.0 \quad N_2 = 1.64769 \quad V_2 = 33.8$
$R_4 = -1465.0$
$\quad d_4 = 0.125$
$R_5 = 27.93$
$\quad d_5 = 1.875 \quad N_3 = 1.48749 \quad V_3 = 70.1$
$R_6 = 160.295$
$\quad d_6 = 15.4875$
$R_7 = 48.6825$
$\quad d_7 = 0.625 \quad N_4 = 1.74950 \quad V_4 = 35.2$
$R_8 = 14.405$
$\quad d_8 = 2.125 \quad N_5 = 1.60323 \quad V_5 = 42.3$
$R_9 = 321.5$
$\quad d_9 =$ Variable
$R_{10} = -16.25$
$\quad d_{10} = 0.5618 \quad N_6 = 1.51633 \quad V_6 = 64.1$
$R_{11} = -17.5$
$\quad d_{11} = 0.2325$
$R_{12} = -48.3808$
$\quad d_{12} = 0.8498 \quad N_7 = 1.63854 \quad V_7 = 55.4$
$R_{13} = -41.5139$
$\quad d_{13} =$ Variable
$R_{14} = -23.4936$
$\quad d_{14} = 0.4735 \quad N_8 = 1.7859 \quad V_8 = 44.2$
$R_{15} = 139.742$
$\quad d_{15} = 1.25 \quad N_9 = 1.74077 \quad V_9 = 27.8$
$R_{16} = -38.0251$ Variable axial distance:

| Object distance (from the image plane) | ∞ | −2000 |
|---|---|---|
| $d_9$ | 17.4075 | 11.0 |
| $d_{13}$ | 0.2337 | 10.235 |
| Equivalent focal length $f$ of the entire optical system | 100 | 92.57 |

Axial distance from the first front surface to the image plane = 86.67

$f_A = +2442.12$ $f_B = -72.75$

Aberration coefficient
(for finite focusing distance)

| No. | I | II | III | P | V |
|---|---|---|---|---|---|
| 1 | 3.4258 | 0.0022 | 0.0000 | 0.8180 | 0.0005 |
| 2 | 0.0070 | 0.0356 | 0.1814 | −0.3126 | −0.6687 |
| 3 | −3.4182 | 2.9665 | −2.5745 | −0.5346 | 2.6982 |
| 4 | −0.0000 | 0.0001 | −0.0244 | 0.0268 | −0.6385 |
| 5 | 10.1595 | −0.8936 | 0.0786 | 1.1734 | −0.1101 |
| 6 | 0.3384 | −0.5860 | 1.0146 | −0.2045 | −1.4029 |
| 7 | −0.0136 | −0.0966 | −0.6871 | 0.8800 | 1.3725 |
| 8 | −4.2570 | −0.2963 | −0.0206 | −0.3620 | −0.0266 |
| 9 | 1.3282 | −1.4695 | 1.6258 | −0.1171 | −1.6693 |
| 10 | −12.2477 | 1.1048 | −0.0997 | −2.0955 | 0.1980 |
| 11 | 9.8826 | −1.1018 | 0.1228 | 1.9458 | −0.2306 |
| 12 | −2.9329 | 1.4248 | −0.6922 | −0.8055 | 0.7276 |
| 13 | 3.7117 | −1.4360 | 0.5556 | 0.9387 | −0.5781 |
| 14 | −7.5817 | 1.3532 | −0.2415 | −1.8731 | 0.3774 |
| 15 | −0.0001 | −0.0004 | −0.0033 | −0.0104 | −0.1032 |
| 16 | 1.7387 | −0.9755 | 0.5473 | 1.1138 | −0.9320 |
| Σ | 0.1407 | 0.0314 | −0.2171 | 0.5814 | −0.9859 |

Example 4:

Numerical data in the operational position for infinite focusing distance are the same as those tabulated in Example 3. In operational positions for near focusing distances, however, axial airspace $d_{11}$ is varied along with $d_9$ and $d_{13}$.

Variable axial distance:

| Object distance | ∞ | −2000 |
|---|---|---|
| $d_9$ | 17.4075 | 11.5 |
| $d_{11}$ | 0.2325 | 6.14 |
| $d_{13}$ | 0.2337 | 5.113 |
| Equivalent focal length $f$ of the entire lens system | 100 | 92.66 |

Axial distance from the first front surface to the image plane = 86.67

$f_A = -520.22$ $f_B = -72.75$ $f_C = +436.98$

This example has disposed an axially stationary convergent lens member C between movable lens members A and B, constituting the rear lens group. When the objective optical system which has a large telephoto ratio and of which the rear lens group has a weak refractive power is provided with a convergent lens member so interposed between lens members A and B as shown in this example to increase the negative power of lens member B, the distance-adjusting performance can be enhanced.

Figures 1, 5:
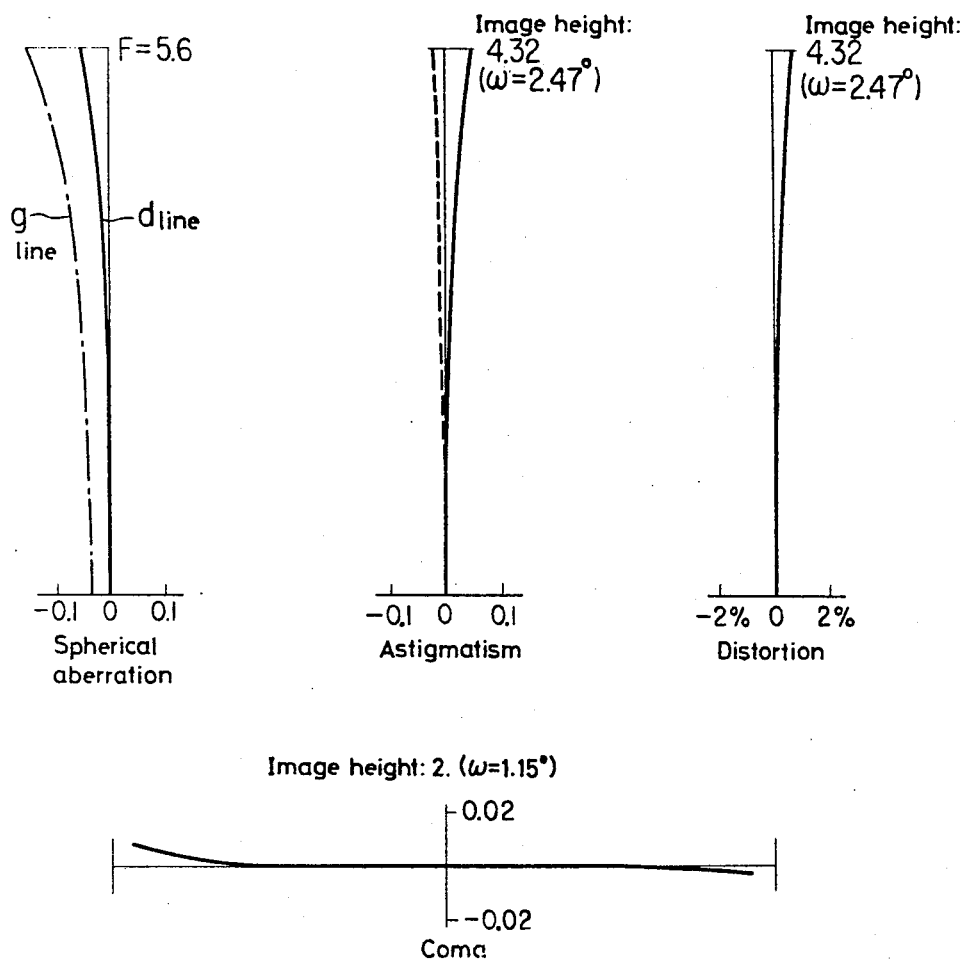
Figures 2, 5:
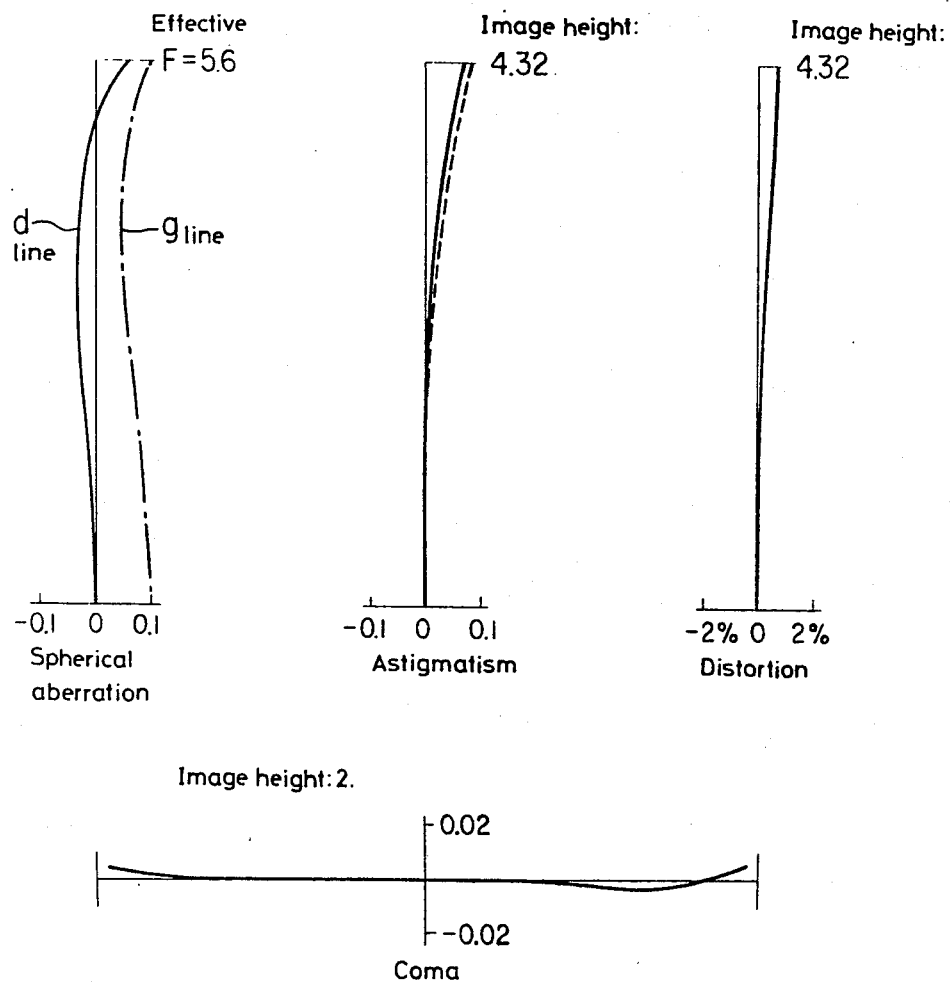
Figures 3, 5:
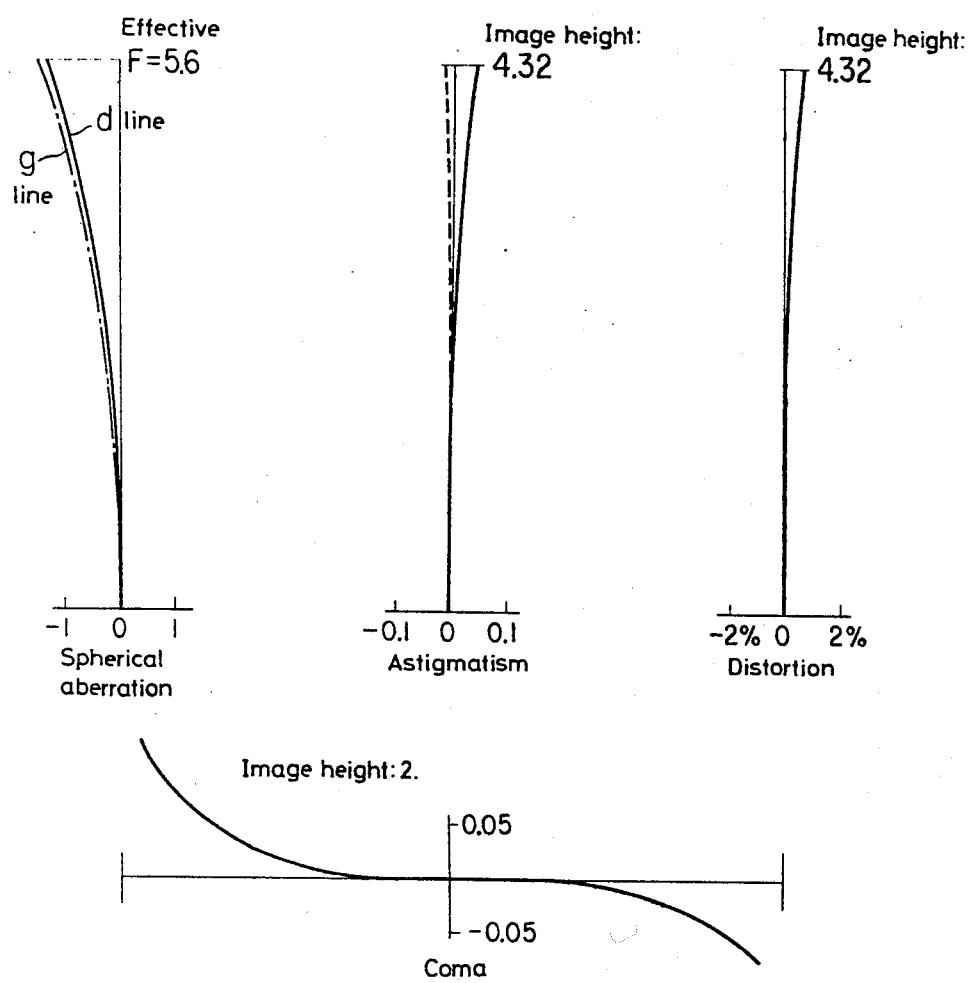

FIG. 5-1 are aberration curves of the objective optical system embodying Example 1 when focused upon an object at infinite distance, while FIG. 5-2 are aberration curves of the same system when focused upon an object at a distance of −2,000. FIG. 5-3 are reference aberration curves of the same system when focused at an object distance of −2,000 on assumption that lens member A and lens member B are moved rearwardly as a unit for focusing. (Note that the abscissa of the spherical aberration curve and the ordinate of the coma aberration curve are expressed respectively in 10 times and 2.5 times scales as large as those of FIG. 5-1 or 5-2. It is apparent from FIG. 5-3 that the spherical and coma aberration variations are far larger than those shown in FIGS. 5-1 and 5-2, and that the image aberrations are remarkably deteriorated for high grade optical performance. However, according to this invention, the state of correction of the image aberrations can be made to remain excellent.

Figures 1, 6:
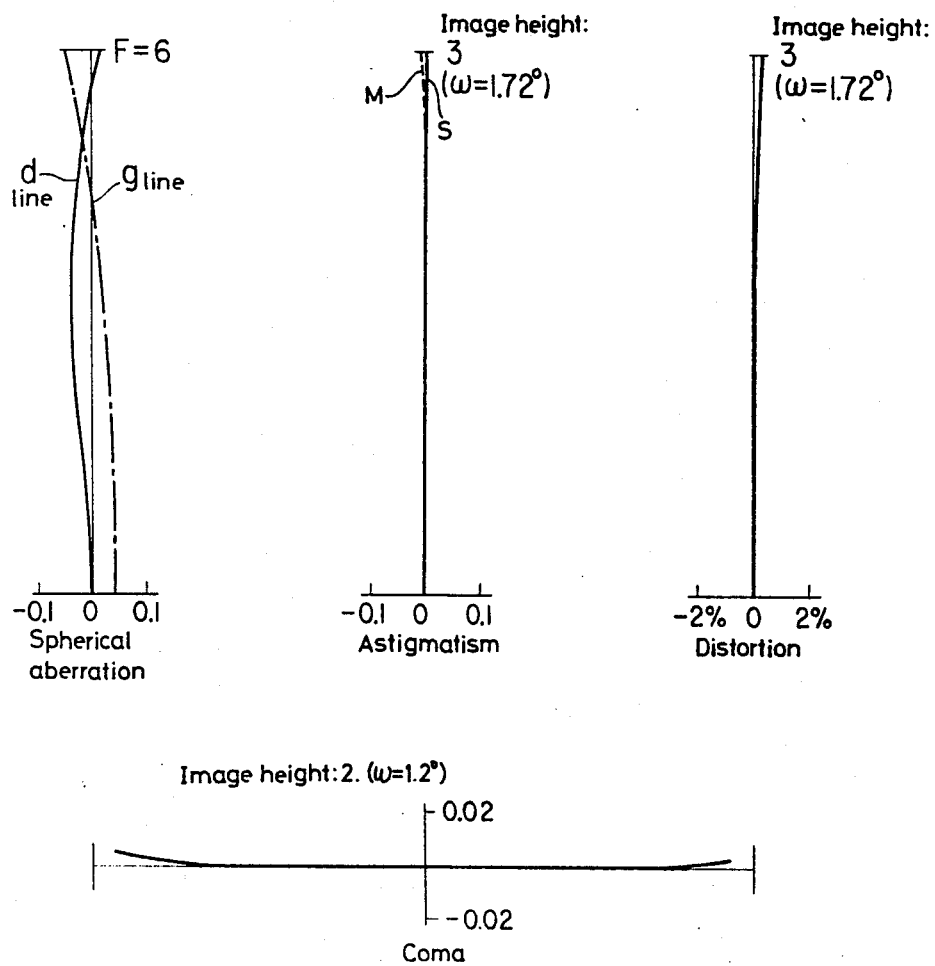
Figures 2, 6:
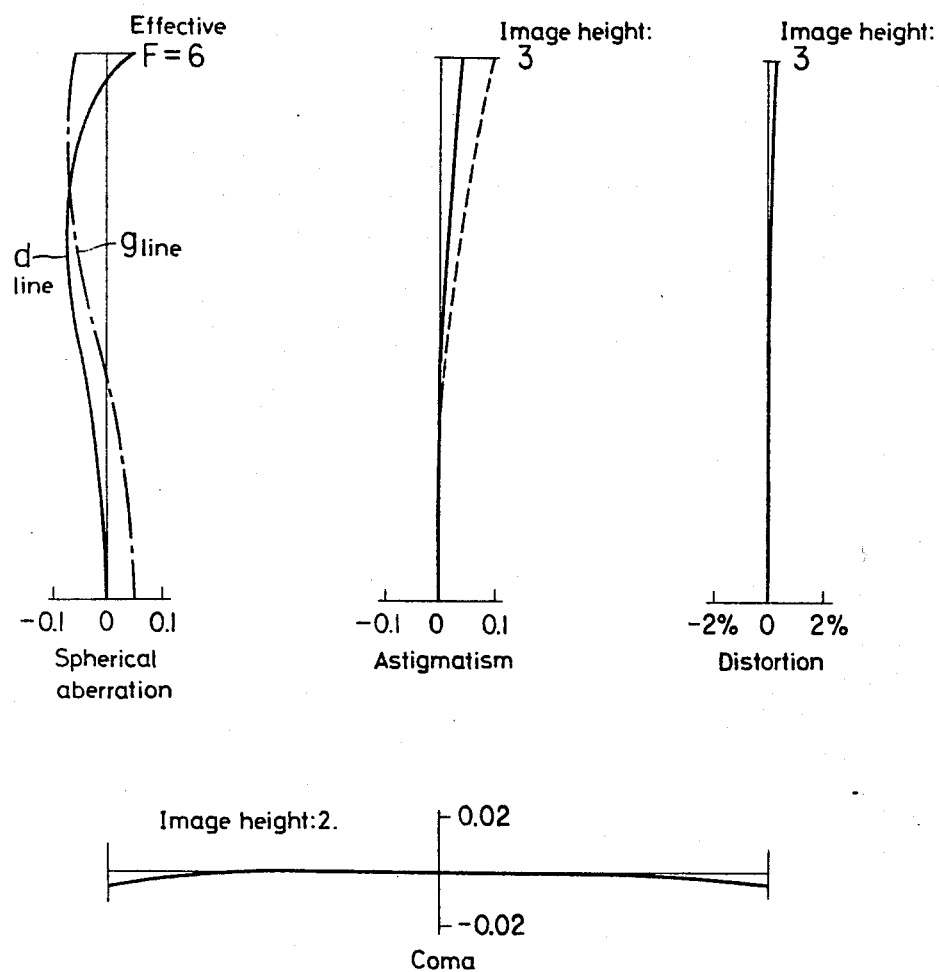

FIG. 6-1 are aberration curves of the objective optical system embodying Example 2 when focused upon an object at infinite distance, while FIG. 6-2 are aberration curves at an object distance of −2,000. It is apparent from the figures that even in operational positions for near focusing distances, the state of correction of the image aberrations remains excellent, and that particularly in this example the variation of the on-axis chromatic aberration is small throughout because lens member A is composed of achromatic cemented lens elements.

Figures 1, 7:
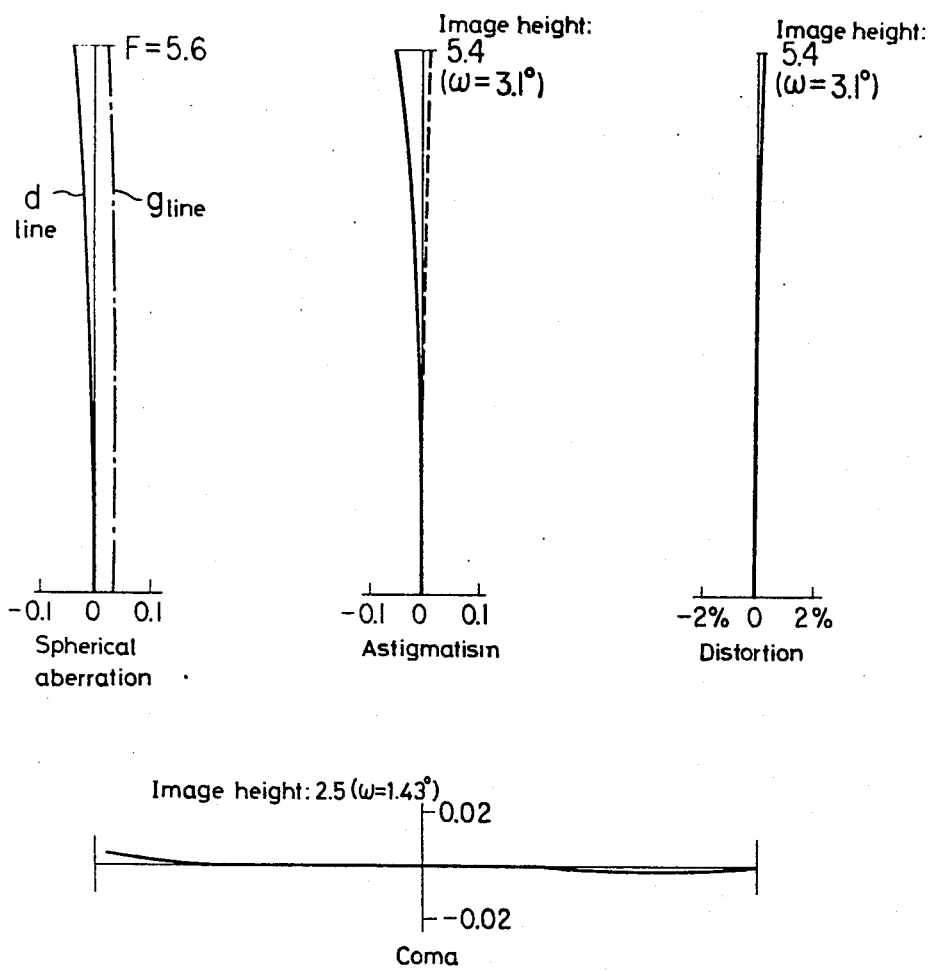
Figures 2, 7:
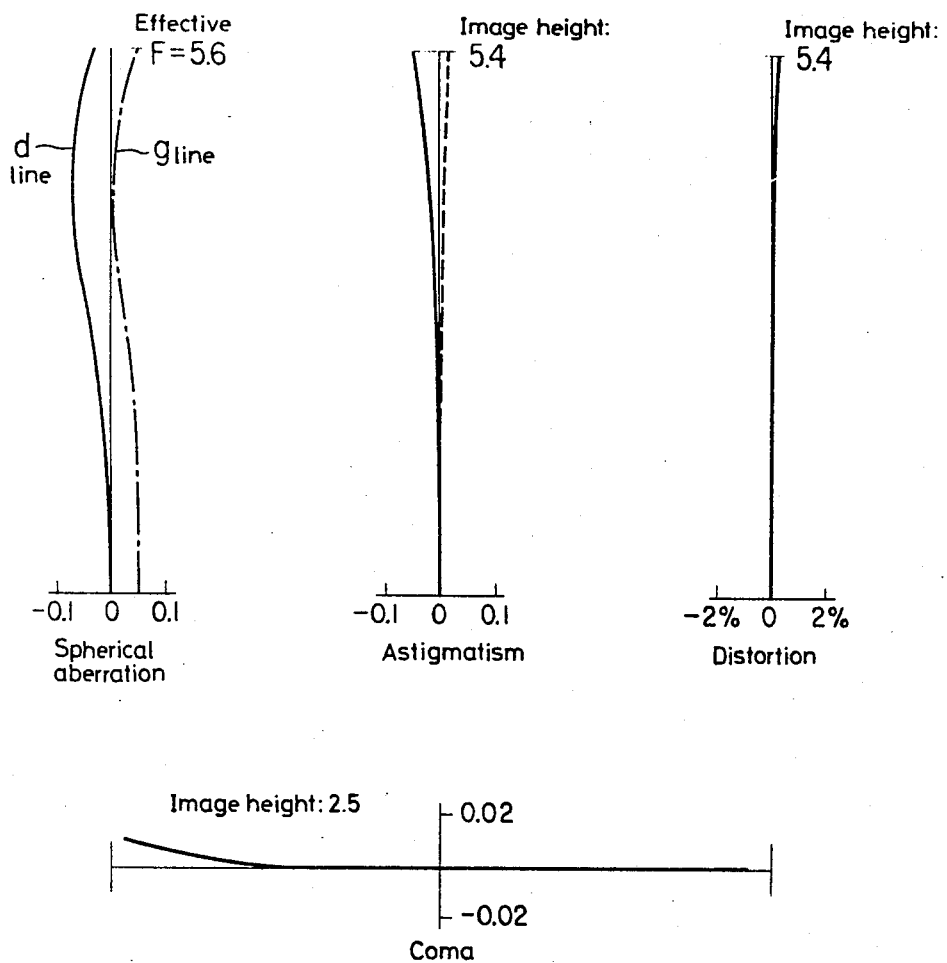

FIG. 7-1 are aberration curves of the objective optical system embodying Example 3 when focused upon an object at infinite distance, while FIG. 7-2 are aberration curves when focused upon an object at a distance of −2,000. It is apparent from the figures that even in the near distance focusing, the state of correction of the image aberrations remains excellent, and that particularly in this embodiment, the astigmatism variation is extremely small throughout because the lens member A is composed of a meniscus concave singlet and a meniscus convex singlet.

Figure 8:
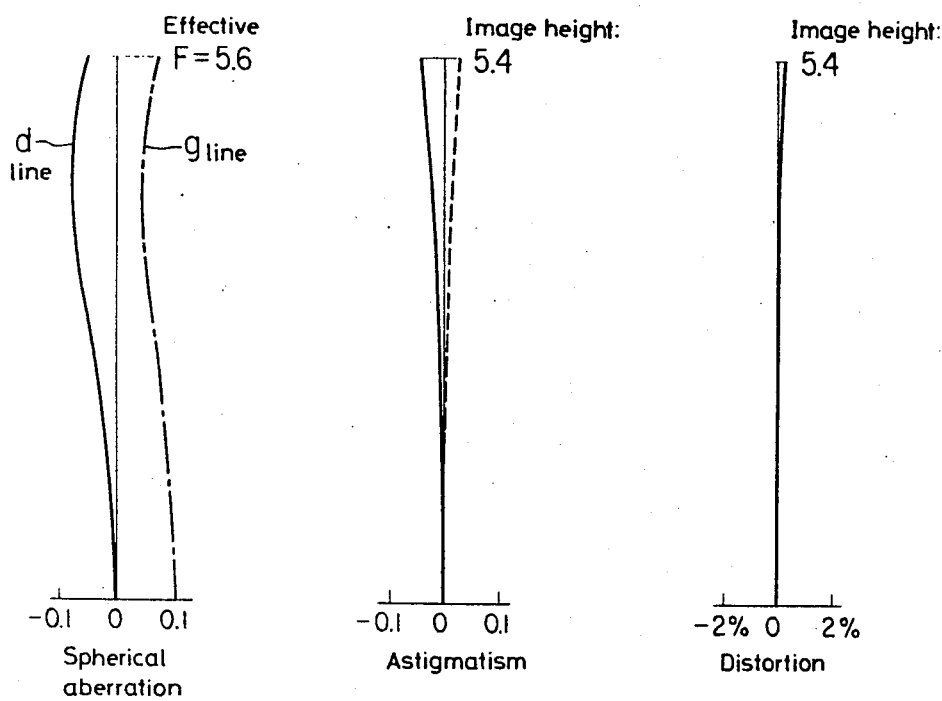
FIG. 8 are aberration curves of Example 4 when focused at an object distance of −2000.
Figure 8:
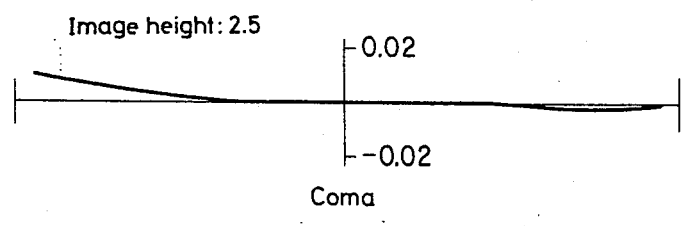

FIG. 8 are aberration curves of the objective optical system embodying Example 4 when focused upon an object at a distance of −2,000. This embodiment is also well corrected for the aberrations.

What is claimed is:

1. In a method for focusing, on an image plane, a telephoto-type objective lens system having front and rear lens groups disposed in rearward succession along an optical axis between an object and the image plane, the front lens group being of positive power and the rear lens group having at least two lens members, the improvement which comprises the step of simultaneously moving the frontmost and rearmost members of the rear lens group in respectively opposite axial directions while the front lens group is held stationary.

2. The improved method as defined in claim 1 in which the rear lens group is of negative power.

3. A telephoto-type objective lens system comprising a front lens group of positive power and a rear lens group of negative power disposed in rearward succession along a system optical axis between an object and an image plane, the rear lens group having movable frontmost and rearmost lens members, and means for simultaneously moving said movable lens members in respectively the opposite the axial directions independent of the front lens group.

4. The improvement as defined in claim 3 in which the front lens group comprises a pair of axially spaced positive lens members.

5. The improvement as defined in claim 3 in which the frontmost movable lens member in the rear lens group has at least one divergent surface.

6. The improvement as defined in claim 3 in which the frontmost movable lens member in the rear lens group is of positive power.

7. The improvement as defined in claim 3, in which the frontmost movable lens member in the rear lens group is of negative power.

8. The improvement as defined in claim 3, in which the focal lens of the rearmost movable lens member in the rear lens group is $f_B$, the focal length of the frontmost movable lens member in the rear lens group is $f_A$, and in which the magnitude of $f_A$ is greater than the magnitude of $f_B$.

9. The improvement as defined in claim 3 in which the rear lens group comprises a fixed lens member intermediate the frontmost and rearmost movable lens members.

10. The improvement as defined in claim 3 in which the front lens group comprises, in rearward succession, a biconvex lens, a biconcave lens, and a positive meniscus lens having a forward convex surface, and in which the frontmost and rearmost movable lens members in the rear lens group comprise first and second negative meniscus lenses each having a forward concave surface.

11. The improvement as defined in claim 10 in which the second negative meniscus lens comprises a forward biconcave lens and a rear biconvex lens cemented together.

12. The improvement as defined in claim 3 in which the front lens group comprises in rearward succession a first positive meniscus lens having a forward convex surface, a first negative meniscus lens having a forward concave surface, a second positive meniscus lens having a forward convex surface, and a positive lens; and in which the frontmost and rearmost movable lens elements in the rear lens group respectively comprise second and third movable negative meniscus lenses.

13. The improvement as defined in claim 12 in which the third negative meniscus lens comprises a forward biconcave lens and a rear biconvex lens cemented together.

14. The improvement as defined in claim 3 in which the front lens group comprises in rearward succession a first positive meniscus lens having a forward convex surface, a first negative meniscus lens having a forward concave surface, a second positive meniscus lens having a forward convex surface, and a positive lens; in which the frontmost and rearmost movable lens elements in the rear lens group respectively comprise second and third negative meniscus lenses each having a forward concave surface; and in which the rear lens group further comprises a third fixed positive meniscus lens having a forward concave surface.

15. The improvement as defined in claim 14 in which the third movable negative meniscus lens comprises a forward biconcave lens and a rear biconvex lens cemented together.

* * * * *